Aug. 17, 1954 W. A. YOUNG 2,686,523
REMOVABLE FILLER ELEMENT FOR THRESHER CONCAVES
Filed April 7, 1952 2 Sheets-Sheet 1

INVENTOR.
W. A. Young
BY
Attorneys

Aug. 17, 1954            W. A. YOUNG            2,686,523
REMOVABLE FILLER ELEMENT FOR THRESHER CONCAVES
Filed April 7, 1952            2 Sheets-Sheet 2
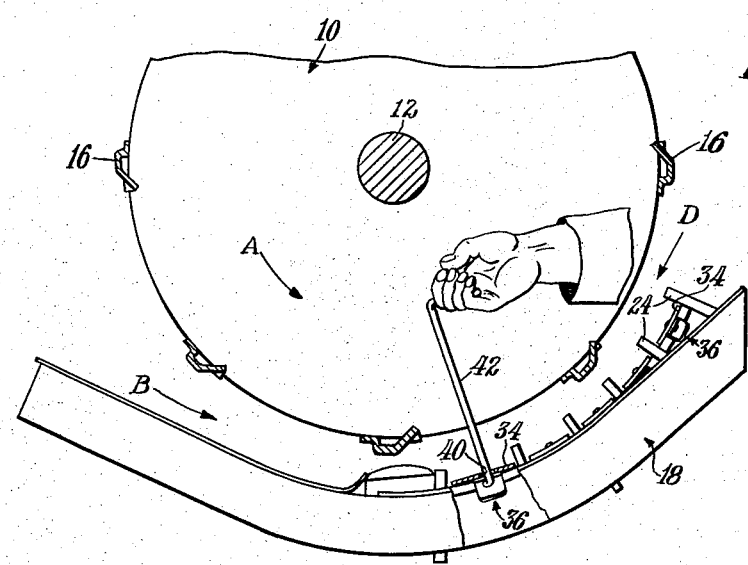
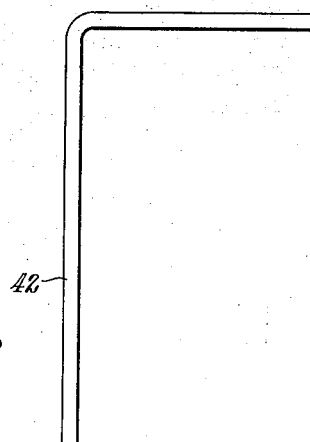
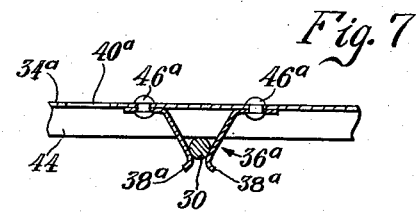
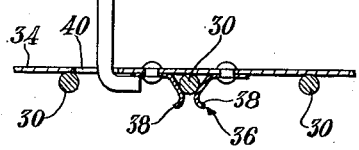
INVENTOR.
W. A. Young
Attorneys Patented Aug. 17, 1954

2,686,523

UNITED STATES PATENT OFFICE 2,686,523

REMOVABLE FILLER ELEMENT FOR THRESHER CONCAVES

William A. Young, Rock Island, Ill., assignor to Deere & Company, Moline, Ill., a corporation of Illinois Application April 7, 1952, Serial No. 280,951

5 Claims. (Cl. 130—27)

This invention relates to a thresher attachment and more particularly to means cooperative with the thresher concave grate for varying the aggressiveness of the threshing action.

Typical thresher mechanism comprises a cylinder rotatable on a horizontal axis above an underlying concave. The cylinder may include a plurality of axially running, peripherally spaced thresher bars cooperative with a plurality of parallel bars on the threshing concave. Grain fed between the undersurface of the cylinder and the upper surface of the concave is threshed. Various grains, however, require different treatment; that is, to the extent that certain threshing mechanisms are either too aggressive or not aggressive enough for different grains. Accordingly, it is known to provide means for varying the aggressiveness of the threshing mechanism. Conventionally, this means comprises either interchangeable concaves or grates or insertable and removable elements usable with either the cylinder or the concave or both. Primarily, aggressiveness of threshing mechanisms varies directly with the size and extent of projections on either or both the cylinder or concave. Since the cylinder is rotatable and the concave is fixed, it is more desirable to use the attachment in association with the concave, thus eliminating the possibility of unbalancing the cylinder.

One form of thresher concave is made up of a plurality of elongated bars running parallel to the axis of the cylinder. These bars may be interconnected in any suitable fashion by rods or the like, the net result being that the concave is in the form of a grate or grille through which may fall some of the material being threshed. Whatever means interconnects the grate bars lies below the upper or cylinder-proximate edges of the bars so that there are substantial spaces between the bars and the extent to which the cylinder-proximate portions of the bars project above the surface of the interconnecting means determines the aggressiveness of the concave or grate. If the spaces are filled or partly filled, the aggressiveness of the grate will be varied. It is in this respect that the present invention provides an important improvement, not only because it deals with attachment members or elements for a concave grate but because it facilitates the attachment and removal of these elements so that the threshing mechanism may be easily and rapidly converted for handling different types of grain. It is an object of the invention to provide filler elements for the grate, each of which has securing means enabling attachment of one or more elements to the grate without the use of nuts and bolts or like securing means. Preferably, the improved securing means are in the form of opposed spring clips that seize or release the connecting means between the bars, so that the elements may be positioned by downward pressure and removed by upward force. Another important object is to provide each filler element with an aperture or the like with which a suitable tool may be associated for removing the elements. It is contemplated that installation and removal of the elements can be accomplished without removal of the grate from the threshing mechanism. In this respect, advantage is taken of the open-work or skeleton nature of the cylinder so that the user may reach between the cylinder bars for installing and removing the grate elements.

It is also an important object to provide the filler elements for purchase individually or in sets as attachments for conventional threshing mechanism.

The foregoing and other important objects and desirable features inherent in and encompassed by the invention will become apparent as two preferred embodiments of the invention are disclosed in detail in the following description and accompanying sheets of drawings in which Figure 1 is a fragmentary perspective view of a typical kind of threshing mechanism;

Figure 5 is an enlarged fragmentary schematic view showing how the filler elements may be removed;

Figure 6 is a fragmentary sectional view on an enlarged scale showing the manner in which a removing tool may be associated with the filler elements; and Figure 7 is a fragmentary sectional view of the securing means used in that form of element illustrated in Figure 4.

Figure 1:
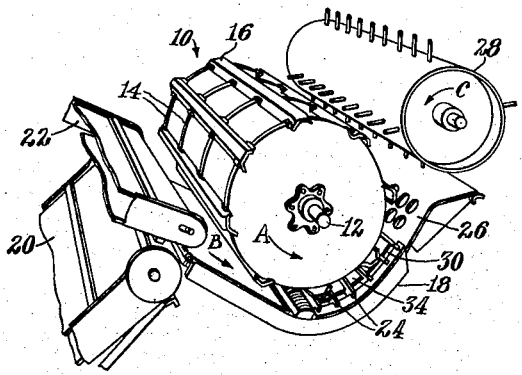

In the representative form of threshing mechanism shown in Figure 1, the numeral 10 represents generally a threshing cylinder rotatable on a horizontal axis by means of a cylinder shaft 12. The direction of rotation of the cylinder is indicated by the arrow A. The cylinder, as is generally conventional, may be made up of a plurality of circular plates 14 across which are rigidly arranged a plurality of cylinder bars 16. These bars run axially of the cylinder and are peripherally spaced about the circular plates 14, giving the cylinder a construction of open-work or skeleton nature.

The cylinder rotates above a concave, here designated generally by the numeral 18. Grain or other crops to be threshed are fed to the space between the cylinder 10 and concave 18 by means of a pair of suitable conveyors 20 and 22, the grain moving downwardly and under the cylinder 10 in the direction of the arrow B (Figure 1). As the material is threshed, it is carried upwardly or to the right and in the course of its travel it passes over a plurality of concave grate bars 24. These bars are parallel to the cylinder bars 16 and lie in an arc substantially concentric with the axis of the cylinder shaft 12. As the grain is threshed from the straw, it falls through appropriate spaces in the concave and the straw continues upwardly over a perforated plate 26 to be carried away from the threshing mechanism by a beater 28, which rotates in the direction of the arrow C.

Figure 2:
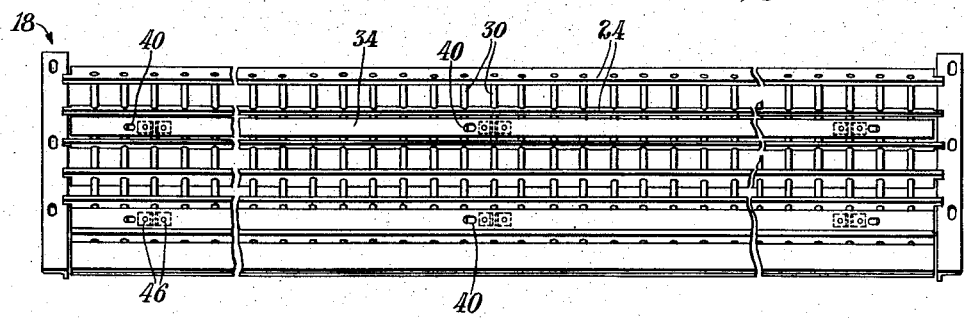
Figure 2 is a plan view on an enlarged scale of a typical thresher concave having filler elements installed between certain of the grate bars thereof.
Figure 3:
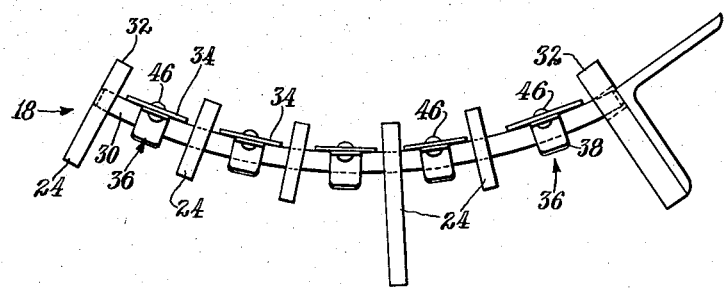
Figure 3 is an enlarged end view of the thresher concave as equipped with one form of filler element.
Figure 4:
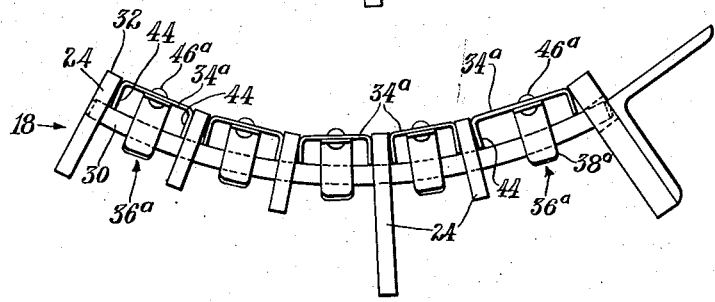
Figure 4 is a view similar to Figure 3 but illustrating a different form of filler element.

The construction of the concave 18 is best shown in Figures 2, 3 and 4, wherein it will be seen that the grate bars 24 are interconnected by a plurality of spaced apart parallel curved rods 30. The entire construction may be fabricated by welding so that the concave is relatively rigid and capable of retaining its shape for a prolonged period of operation. As shown in Figure 3, the upper edges of the grate bars 24 are above the general curved surface of the tops of the connecting rods 30, so that these upper edges of the grate bars establish cylinder-proximate portions 32. It is these portions in cooperation with the cylinder bars 16 that accomplish threshing. As previously stated, as the grain is threshed from the straw, it drops downwardly through the spaces between the grate bars and the grate rods and the straw is carried upwardly and taken away by the beater 28.

Various problems occur in connection with the operation of threshing mechanisms, the most important of which are those caused by variations in the threshing characteristics of different grains. For example, clover will require a more aggressive threshing action than will certain other grains. At the same time, the threshing action for clover might not be as aggressive as that necessary for sturdier grains. In any event, the same threshing mechanism can be modified or converted from time to time to adapt it to various types of grain merely by the addition of means that will modify the relationship between the cylinder bars 16 and the grate bars 24. According to the present invention, such modification of threshing action is accomplished by the provision of a plurality of strips or filler elements 34 preferably formed of sheet metal although capable of use if formed of other material. Each element 34 is relatively narrow and elongated so as to fit between and substantially span the space between a pair of neighboring grate bars 24. When the elements 34 are in place, they reduce the sizes of the spaces formed by the intersection of the grate bars 24 and grate rods 30 and at the same time add to the height of the rods 30 according to the thickness of the filler elements.

As stated above, filler elements in general are known but most of these require almost complete disassembly of the threshing mechanism for installation and removal thereof. It is in this respect that the present invention provides an improvement, for the herein disclosed filler elements may be installed and removed without disturbing the threshing mechanism in any respect. For this purpose, each filler element is provided at its undersurface with a plurality of securing means designated generally by the numeral 36, each adapted to engage an associated rod portion between the pair of neighboring grate bars 24 with which the particular filler element is associated. As best shown in Figure 6, each securing means comprises a pair of biased connectors or opposed spring clips 38 selectively downwardly engageable with or upwardly releasable from the associated rod 30. Since the filler elements are of relatively thin construction throughout, they may be readily inserted for preliminary location relative to the grate bars 24 by movement generally in the direction of the arrow D in Figure 5. When a filler element is located in place between a pair of neighboring grate bars, with its securing means 36 centered over the appropriate rod 30, the operator may reach between the bars 16 of the cylinder and by pressing downwardly may cause the securing means 36 to seize the associated rod 30. This is a simple operation and the installation of one or more filler elements may be readily accomplished without the use of nuts and bolts and other relatively complicated securing means.

During operation of the threshing mechanism, major forces are primarily radial or downwardly with respect to the filler elements 34 and the biased securing means 36 proves adequate to hold the elements in place. At the same time, the elements may be readily removed, by the process suggested in Figure 5, for example. For this purpose, each element is provided with a plurality of spaced apertures 40, each of which is adapted to receive a suitable downwardly inserted tool or implement, such as the hooked tool indicated at 42, by means of which an upward force may be applied to the element to release it from the grate rod 30. Again, the procedure benefits by the open-work nature of the cylinder, and after the filler elements are released they may be moved out in the direction opposite to that indicated by the arrow D in Figure 5.

In the modified form shown in Figures 4 and 7, filler elements 34a are associated with the bars 24 and rods 30 in a manner similar to that just described. For this purpose, each filler element is provided with securing means 36a similar to the securing means 36 on the filler elements 34. The fundamental difference between the elements 34 and 34a is that in the latter opposite elongated edges are turned down as flanges 44 which serve as spacer means for spacing the outer or cylinder-proximate surfaces of the elements 34a at a predetermined distance from the rods 30. In the arrangement shown in Figure 4, the outer surfaces of the elements 34a lie generally in a curved surface including the cylinder-proximate portions 32 of the grate bars 24. An arrangement of this type is what might be termed non-aggressive in action and will be used to thresh grain in which the grain is easily separated from its hull so that the threshing action will not be too violent.

The releasable securing means 36a in this form of the invention comprises opposed spring clips or connectors 38a and each element 34a has a plurality of apertures 40a for receiving the removing tool 42. Except for the flanges forming the spacer means 44 and the consequent variations in aggressiveness, the elements 34 and 34a may be considered identical.

With respect to the elements 34, the securing means 36 is shown as including rivets 46 for effecting attachment of the spring clips 38 to the elements. Similar rivets 46a are shown in connection with the elements 34a. It will be understood, of course, that other forms of fasteners or even welding may be used in place of the rivets.

Various other modifications and alterations may be made in the preferred form of the invention illustrated without departing from the spirit and scope of the invention.

What is claimed is:

1. An attachment for a generally horizontally positioned thresher concave of the type made up of a plurality of parallel rods running lengthwise of the arc of the concave and cross-connected by a plurality of spaced apart parallel grate bars normal to the rods and presenting threshing portions projecting above the rods, comprising: a filler element usable as one of a plurality of similar elements for filling the spaces between the grate bars, said element being of plate-like form having an outer upper surface of such length as to extend parallel to the grate bars and of such width as to span the space between a pair of neighboring grate bars, said element having an inner undersurface to lie proximate to and atop the rod portions between the pair of neighboring grate bars, said element having affixed to said undersurface a plurality of releasable securing means spaced apart lengthwise of the element and adapted to engage certain of the rod portions between the pair of neighboring grate bars, each securing means being of the snap-on snap-off type including a biased connector to frictionally and resiliently grip the associated rod portion so as to be downwardly engageable with and upwardly releasable from the associated rod portion, and said element having a plurality of apertures therethrough respectively adjacent to the securing means, each aperture adapted to receive a downwardly inserted hooked tool engageable with an undersurface portion of the element bordering the aperture by means of which an upward force may be applied to the element via such tool to release the securing means from the grate.

2. The invention defined in claim 1, in which: said element carries spacer means on its undersurface engageable with certain of the rod portions between the pair of neighboring grate bars for determining the position of the outer surface of the element relative to the threshing portions of the grate bars.

3. The invention defined in claim 1, in which: the element is of sheet metal and the spacer means includes turned down flanges along its opposite grate-bar-proximate edges for engaging certain of the rod portions.

4. An attachment for a generally horizontally positioned thresher concave of the type made up of a plurality of parallel grate bars crosswise of the arc of the concave and presenting upstanding threshing portions and connected by grate members running lengthwise of the concave and lying below the threshing portions, comprising: a filler element usable as one of a plurality of similar elements for filling the spaces between the grate bars, said element being of plate-like form having an outer upper surface of such length as to extend parallel to the grate bars and of such width as to span the space between a pair of neighboring grate bars, said element having an inner undersurface to face downwardly to the grate member portions between the pair of neighboring bars, said element having affixed to said undersurface a plurality of releasable securing means spaced apart lengthwise of the element and adapted to be selectively connected to and disconnected from the grate member portions, and said element having a plurality of apertures therethrough respectively adjacent to the securing means and each provided access from above to the associated securing means for facilitating release of the element from the grate.

5. An attachment for a generally horizontally positioned thresher concave of the type made up of a plurality of parallel rods running lengthwise of the arc of the concave and cross-connected by a plurality of spaced apart parallel grate bars normal to the rods and presenting threshing portions projecting above the rods, comprising: a filler element usable as one of a plurality of similar elements for filling the spaces between the grate bars, said element being of plate-like form having an outer upper surface of such length as to extend parallel to the grate bars and of such width as to span the space between a pair of neighboring grate bars, said element having an inner undersurface to lie proximate to and atop the rod portions between the pair of neighboring grate bars, and said element having affixed to said undersurface a plurality of releasable securing means spaced apart lengthwise of the element and adapted to engage certain of the rod portions between the pair of neighboring grate bars, each securing means including a pair of opposed spring clips downwardly engageable with and upwardly releasable from the associated rod portion to respectively seize and release such rod portion.

References Cited in the file of this patent

UNITED STATES PATENTS

| Number | Name | Date |
|---|---|---|
| 713,888 | Kellner | Nov. 18, 1902 |
| 2,159,664 | Lindgren | May 23, 1939 |
| 2,577,329 | Irvine | Dec. 4, 1951 |